Nov. 11, 1969   D. JOHNSON   3,477,228
GAS TURBINE POWER PLANT

Original Filed Dec. 12, 1966   2 Sheets-Sheet 1

INVENTOR.
Douglas Johnson
BY
Paul Fitzpatrick
ATTORNEY

Nov. 11, 1969 D. JOHNSON 3,477,228
GAS TURBINE POWER PLANT
Original Filed Dec. 12, 1966 2 Sheets-Sheet 2

INVENTOR.
Douglas Johnson
BY
Paul Fitzpatrick
ATTORNEY

United States Patent Office 3,477,228
Patented Nov. 11, 1969

3,477,228
GAS TURBINE POWER PLANT
Douglas Johnson, Indianapolis, Ind., assignor to General Motors Corporation, Detroit, Mich., a corporation of Delaware
Original application Dec. 12, 1966, Ser. No. 601,206. Divided and this application Aug. 15, 1968, Ser. No. 752,828
Int. Cl. F01k 25/08, 3/24; C06b 15/00
U.S. Cl. 60—36          6 Claims

ABSTRACT OF THE DISCLOSURE

A gas turbine power plant of the recuperative closed circuit type for such uses as torpedo propulsion. The motive fluid is heated by an exothermic reaction of the thermite type. The reaction material is embodied in a chain of plates fed successively through a reaction chamber. The plates embody a refractory metal frame and contain a reinforcing and diluting content of quartz fibers.

---

This application is a division of my application Ser. No. 601,206, filed Dec. 12, 1966, for Gas Turbine Power Plant.

My invention relates to gas turbine power plants and preferably to a closed circuit power plant. The principal object of my invention is to provide a power plant capable of delivering quite considerable total energy at a high rate for a limited period of time, which is of exceptionally light weight and small volume, and which is exceptionally silent. The particular use for which my invention is intended is a power plant for a self-propelled torpedo. Thus, the nature and characteristics of the power plant are such as to make it outstanding for propulsion of a torpedo. However, my invention is not limited to this application, and the power plant and various features thereof may have other important uses.

There are numerous factors that are important in rating a torpedo propulsion system. These include speed, which is primarily a function of the horsepower developed; secondly, range, which depends primarily upon the total energy available. Since the energy required to propel a torpedo a given distance increases with speed, range and speed are to some extent inverse factors. A third important item is depth capability. A torpedo which can deliver a given amount of energy or power at great depth is preferable to one whose performance is limited by or decreases with depth. A fourth important consideration is the presence or absence of a wake; that is, a visible indication such as air bubbles by which the course of the torpedo can be seen.

A fifth consideration is noise; this is extremely important in view of the use of listening devices for detecting the approach of torpedoes and determining their course. Beyond this it is obvious that a torpedo propulsion engine, including its source of energy, must be of relatively small volume and weight to be housed in the torpedo. Reliability, safety, and other factors are important in this particular field; cost is of secondary importance.

My invention provides a torpedo propulsion system which is outstanding with respect to the characteristics set out above. This advance in the art is due primarily to the use of a solid reaction material capable of liberating very considerable energy at high temperatures in connection with a closed circuit gas turbine system employing a motive fluid which is inert to the reaction material. More specifically, I employ a reaction of the thermite type conducted with improved materials or reaction units, which are to be described, to heat helium for use in a compact closed cycle gas turbine power plant. In this power plant a high level of energy and considerable endurance are available to provide high speed and range. Since the reaction is self-contained, there is no exhaust and therefore no wake, and performance is independent of depth. The combustion apparatus, turbine, and compressor are substantially noiseless and, by the use of improved reduction gearing, the entire power plant may operate at an extremely low noise level. Also, there is no exhaust gas noise. Compactness and light-weight in relation to power output are characteristic of gas turbine plants and the solid fuel energy source of my invention is also relatively compact.

The principal objects of my invention are to provide a power plant superior to those now available, for propulsion of torpedoes and for other uses; to provide a power plant for relatively short term operation having a high energy level, low weight, and compactness; to provide a very quiet power plant having no exhaust; and to provide heating apparatus in which an inert gas is heated by direct contact with a composition of material undergoing an exothermic reaction which liberates no gas.

The nature of my invention and the advantages thereof will be clear to those skilled in the art from the succeeding detailed description of the preferred embodiment of the invention as a torpedo power plant. Referring to the drawings.

Figure 2:
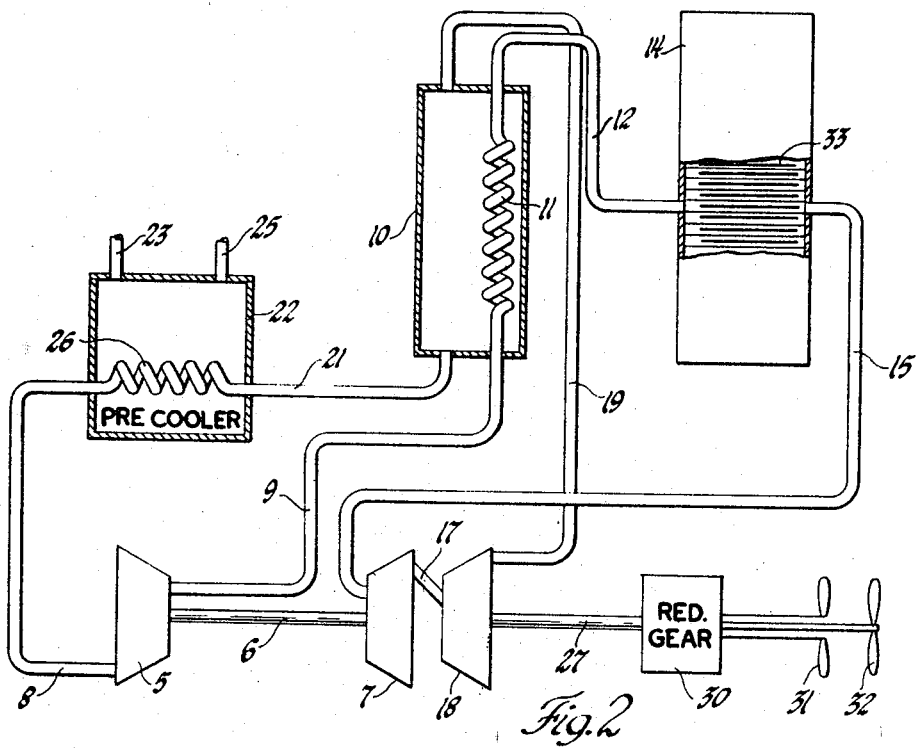
FIGURE 2 is a schematic diagram of such a power plant.

Referring first to FIGURE 2, a generally conventional closed circuit gas turbine system is illustrated. A compressor 5 is coupled by a shaft 6 to a high pressure turbine 7 which drives the compressor. A circulating gas, preferably helium, enters the compressor through a line 8 and is delivered through line 9 to a recuperator 10 within which the compressed gas is in heat exchange relation with turbine exhaust gas. The compressed gas may circulate through a coil 11 and through a conduit 12 to a reaction apparatus 14 within which the gas is further heated. The hot helium then flows through a conduit 15, turbine 7, an interconnecting duct 17, and a low pressure or power output turbine 18, from which it returns through exhaust line 19 to recuperator 10. After giving up heat to the compressed gas, the partly cooled helium flows through conduit 21 to a precooler 22 within which it is cooled by sea water circulated to the cooler through water lines 23 and 25. The helium flows through a coil 26 which in turn connects to compressor inlet line 8, completing the circuit.

The power turbine 18 is connected through a shaft 27 and reduction gearing 30 to coaxial shafts bearing counter-rotating screw propellers 31 and 32. So far as the general power system is concerned, this is a conventional closed circuit power plant, the basic difference being in the nature of the reaction apparatus 14 and the reaction elements 33, which will be further described.

Figure 1:
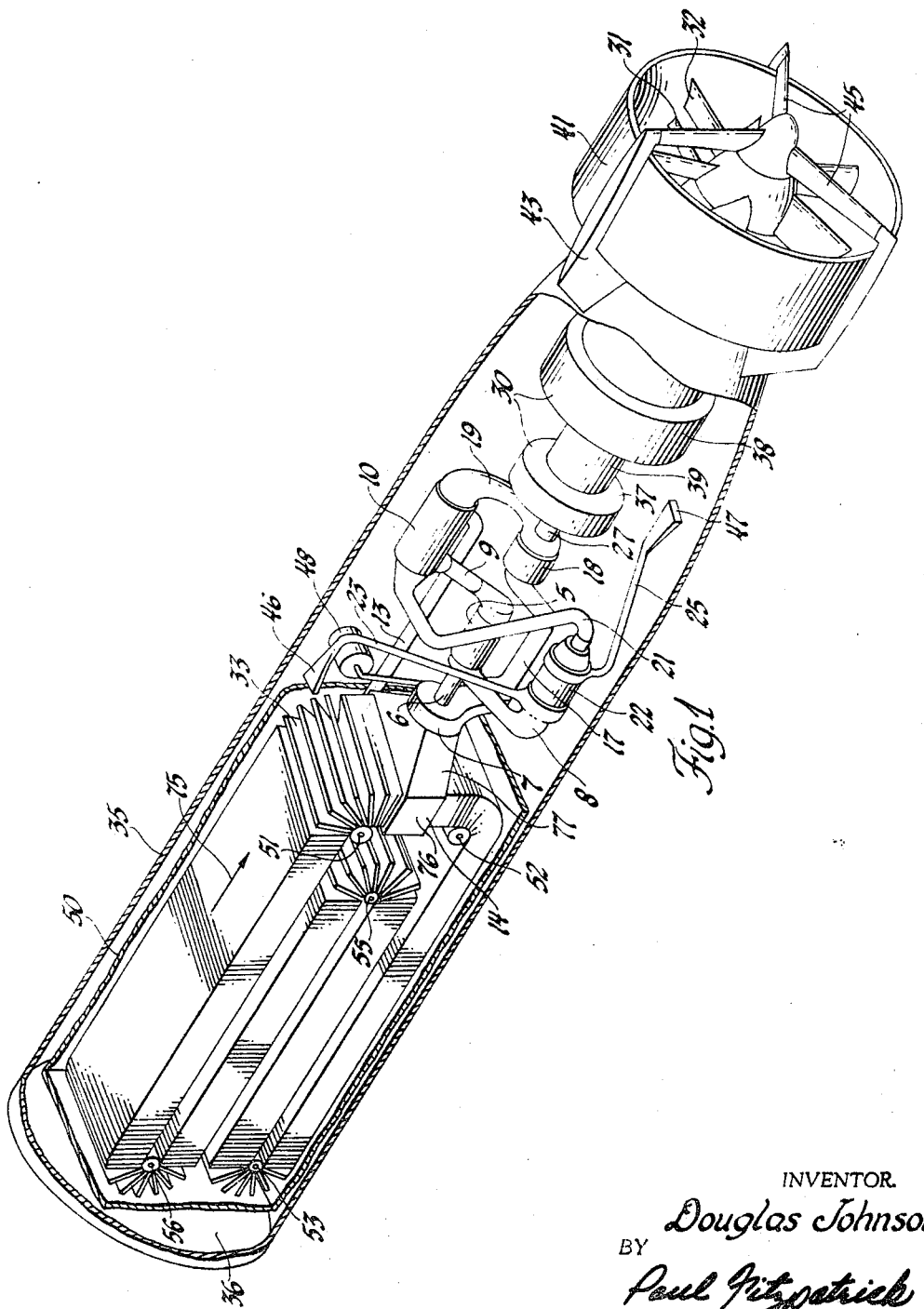
FIGURE 1 is a somewhat schematic axonometric view of a torpedo power plant.

Proceeding to FIGURE 1, a suitable arrangement of the components just referred to in a torpedo is illustrated. Here the aft part of the torpedo hull 35 defines a closed chamber 36 for the power plant and its reaction elements 33, which may be termed "fuel" for consciseness. The reduction gearing 30 which is driven by the power turbine through shaft 27 includes a first stage reduction gear 37 and a second stage reduction gear 38. These may be interconnected by an alternator 39 which provides power for the operation of steering gear and the like. The propellers 31 and 32 are enclosed in a shroud 41 connected to the torpedo hull by radial struts 43; steering vanes 45 are also supported by the struts. Preferably, the propellers are counter-rotating and are driven through a low noise-level friction type reduction gear so as to divide the torque evenly between the two. The cooling water for the precooler 22 is admitted through a forwardly facing inlet 46 projecting from the skin of the torpedo and is exhausted through a rearwardly facing outlet 47. An accumulator 48 contains helium gas for impingement starting of the turbine.

Proceeding to the fuel arrangement, the fuel elements 33 are in tabular form and are arranged in an endless chain or belt within a storage housing 50. As will be apparent, these elements 33 are guided over a roller 51 into the reaction apparatus 14 and proceed thence over rollers 52, 53, 55, and 56 so that the spent elements are returned to the housing 50.

Figure 3:
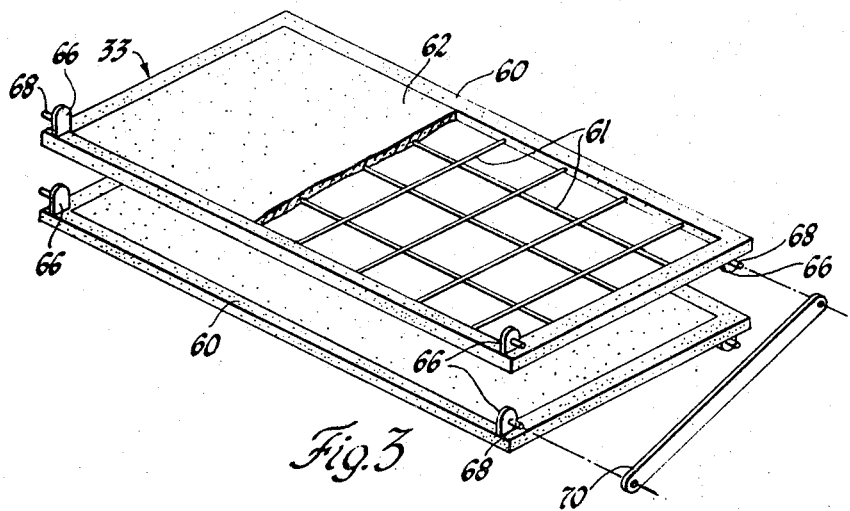
FIGURE 3 illustrates two of the reaction units and the interconnection between the units.

The preferred structure of the fuel units 33 is illustrated in FIGURE 3 from which it will be apparent that each unit 33 is a rectangular tabular or plate-like body. Each body includes a rectangular frame 60 of a high temperature ceramic material. A grid of cross reinforcing wires 61 of tungsten or the like is bonded into the frame 60 before it is fired to provide a high temperature resisting framework for the heat release material. The body 62 of heat release material fills the space within the frame and preferably is bonded around the wires 61. This material may be any suitable exothermic mixture which does not liberate gas when the reaction takes place, and preferably one which remains solid, although it seems possible that a liquid reaction product could be disposed of satisfactorily within the housing. At any rate, the thermite compositions which are preferred provide a solid end product.

Thermite compositions may be defined generally as mixtures of metal oxides with metal reducing agents. Usually the oxide has a low heat of formation and the reducing agents are those which when oxidized have high heats of formation. The most commonly used reaction of this sort follows the equation $3Fe_3O_4 + 8Al \rightarrow 9Fe + 4Al_2O_3$ (5590° F.). Magnesium can be used instead of aluminum, and may be more desirable because of the high melting point of magnesium oxide. The heat release material thus includes a substantially stoichiometric mixture of finely powdered iron oxide and aluminum. Moreover, to further strength the heat release material and to lower to some extent the temperature developed rate of reaction, it is desirably mixed with a refractory reinforcing material which, as presently contemplated, is preferably in the form of quartz fibers. The amount of such reinforcing and diluting material may be varied to suit the particular installation or characteristics desired. In the engine, the helium gas flows across the surface of the body of heat release material and limits the temperature preferably to about 3500° F.

It is important that the thermite powder be clean and free from adsorbed hydrogen and other contaminants to prevent popping and sputtering of metal onto adjacent structure. Once the material is installed in the torpedo it will be stored within a helium atmosphere and will not be exposed to contaminants.

In order to convey the fresh fuel units into the heat release apparatus and return the used ones to storage, they are connected together in a flexible chain by any suitable means, one such means being illustrated in FIGURE 3. The frames 60 bear bosses 66 extending from the frame at each corner. These extend from opposite faces at the opposite edges of the frame. These bosses bear pivot pins 68 extending from them. Links 70 interconnect the bosses 66 of adjacent elements, being pivoted on the pins 68. Such links are provided at both ends of the frame, those at the rear end not being illustrated in FIGURE 3. With this sort of connection the elements 33 can move together parallel or go around the rollers such as 51 and 52. The elements can fan out about either edge by pivoting of the links 70 at one or the other end.

Referring again to FIGURE 1, the reaction unit can be considered to be moving in the direction indicated by arrow 75 and thus downwardly through the reaction apparatus 14. Primarily, this apparatus provides a chamber through which the plates move and through which the helium delivered by pipe 13 into a plenum 76 ahead of the reaction units flows between the units and into a transition section 77 which connects to the inlet of first stage turbine 7. The reaction apparatus may be sealed to some extent from the storage housing 50 but preferably the housing 50 is maintained at or about normal turbine inlet pressure, which may be about 1600 p.s.i., and is filled with helium, so there is no leakage problem.

The reaction units 33 may be moved by any suitable means such as a motor (not illustrated) energized from the generator 39. Also, any suitable means for initiating the reaction may be provided. This requires heating of the mixture to about 1800° F., which is easily accomplished. For example, each fuel element may include a small electrically-initiated squib of the sort used for igniting rockets. Such a squib may be provided with contacts which engage fixed energized contacts in the reaction chamber (not illustrated) as the fuel elements move into position. It may also be feasible to ignite the first fuel element by any suitable means and depend upon heat radiated from one fuel element to the next to continue the reaction as successive fuel elements are brought into the reaction chamber.

My engine is intended primarily to deliver a high power output and my invention is not concerned with any means for modulating the power delivered. However, various means may be employed, such as bypassing the power turbine, varying the amount of water supplied to the precooler, or varying the rate of feed of the fuel elements to the reaction chamber.

It should be clear to those skilled in the art from the foregoing that my invention provides a power plant of unusual and highly desirable characteristics and a novel and useful heating apparatus for a power plant.

The detailed description of the preferred embodiment of the invention for the purpose of explaining the principles thereof is not to be considered as limiting the invention, since many modifications may be made by the exercise of skill in the art.

What is claimed is:

1. A gas turbine power plant comprising, in combination, a compressor, a reaction apparatus, turbine means connected to drive the compressor and an external load, the compressor, reaction apparatus, and turbine means being connected for flow through them in series of a gaseous motive fluid, a store of solid phase reaction units capable of undergoing an exothermic reaction with substantial heat release, means for conveying the reaction units successively into the reaction zone and establishing the exothermic reaction therein, and a gaseous motive fluid chemically inert to the reaction units and their reaction products delivered by the compressor through the reaction apparatus to the turbine.

2. A power plant as recited in claim 1 which is of the closed circuit type including means for returning the motive fluid from the turbine means through a cooler.

3. A power plant as recited in claim 1 including a housing for the store of reaction units, and in which the housing is filled with the said motive fluid at a pressure approximately that of the compressor outlet.

4. A power plant as recited in claim 1 including relatively silient friction-type reduction gearing connecting the turbine means to the external load.

5. A power plant as recited in claim 1 in which each reaction unit comprises a refractory supporting framework, and a body of heat release material supported by the framework, the said body being a solid mixture of a thermite composition and a refractory diluting substance to retard the exothermic reaction of the thermite composition.

6. A power plant as recited in claim 1 in which the reaction units comprise a thermite mixture and the motive fluid is helium.

References Cited
UNITED STATES PATENTS

| | | | |
|---|---|---|---|
| 802,256 | 10/1905 | Bamberger et al. | 149—37 |
| 2,704,437 | 3/1955 | Thomsen | 60—37 |
| 3,224,199 | 12/1965 | Best | 60—59 |

FOREIGN PATENTS 892,141    3/1962    Great Britain.

EDGAR W. GEOGHEGAN, Primary Examiner

ROBERT R. BUNEVICH, Assistant Examiner

U.S. Cl. X.R.

60—37, 59; 122—21; 149—37